(12) United States Patent
Färber et al.

(10) Patent No.: US 6,621,874 B1
(45) Date of Patent: Sep. 16, 2003

(54) METHOD AND RADIO STATION FOR DATA TRANSMISSION

(75) Inventors: Michael Färber, Wolfratshausen (DE); Norbert Löchel, München (DE); Franz Schreib, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/636,628

(22) Filed: Aug. 11, 2000

Related U.S. Application Data

(63) Continuation of application No. PCT/DE99/00269, filed on Feb. 1, 1999.

(30) Foreign Application Priority Data

Feb. 11, 1998 (DE) ......................................... 198 05 546

(51) Int. Cl.$^7$ .......................... H04L 27/04; H04L 27/12; H04L 27/20
(52) U.S. Cl. ...................... 375/295; 375/285; 370/437; 370/468
(58) Field of Search ................................ 375/305, 259, 375/260, 224, 227, 285, 296, 240, 295, 254; 455/67.3, 69; 370/252, 431, 437, 468, 477

(56) References Cited

U.S. PATENT DOCUMENTS

| | | | |
|---|---|---|---|
| 4,785,450 A | * 11/1988 | Bolgiano et al. | |
| 5,712,877 A | 1/1998 | Ho et al. | |
| 5,764,699 A | * 6/1998 | Needham | 375/261 |
| 6,122,291 A | * 9/2000 | Robinson et al. | 370/468 |
| 6,198,734 B1 | * 3/2001 | Edwards et al. | 370/347 |
| 6,252,900 B1 | * 6/2001 | Liu et al. | 375/219 |
| 6,343,104 B1 | * 1/2002 | Splett | 375/274 |

FOREIGN PATENT DOCUMENTS

| | | |
|---|---|---|
| DE | 196 35 533 A1 | 10/1997 |
| EP | 0 360 589 A2 | 3/1990 |

OTHER PUBLICATIONS

"Gausssches Minimum Shift Keying" (Donnevert), dated Apr. 1993, Telkom Praxis, pertains to the modulation method of the paneuropean digital mobile radio communications system, pp. 25–29.

"Continuous Phase Modulation" (Sundberg), dated Apr. 1986, IEEE Communications Magazine, vol. 24, No. 4, pp. 25–38.

"Mobilfunk und intelligente Netze . . . " (Blala et al.), dated 1995, pp. 104–105, pertains to mobile radio communications and intelligent networks.

"Continuous Phase Modulation—Part II: Partial Response Signaling" (Aulin et al.), dated Mar. 1981, IEEE Transactions on Communications, vol. Com. 29, No. 3, pp. 210–225.

"Performance of GMSK and Comparisons with the Modulation Methods of the 12PM3 Class" (D'Aria et al.), dated 1987, pp. 246–252.

\* cited by examiner

*Primary Examiner*—Jean B. Corrielus
(74) *Attorney, Agent, or Firm*—Laurence A. Greenberg; Werner H. Stemer; Gregory L. Mayback

(57) ABSTRACT

Data are transmitted through a radio interface in a GSM mobile radio system. The transmission side performs a continuous phase modulation of the transmission signals for the data to be transmitted. A bandwidth is used which is narrower than that used during a Gaussian minimum shift keying modulation with a modulation bandwidth BT equal to 0.3 so that the radio interface gives right of access on at least one channel with a reduced bandwidth. On the reception side, data detection is carried out without any discrimination between channels with different bandwidths. This enables substantially increased capacity of mobile radiotelephone networks and support for indoor and asymmetrical data transmission applications.

13 Claims, 5 Drawing Sheets

|  | BT=0.15 in dB | BT=0.3 in dB | Gain of BT=0.15 in dB |
|---|---|---|---|
| $10\log_{10}\dfrac{P_{-100kHz\ to\ 100kHz}}{P_{100kHz\ to\ 300kHz}}$ | 25.0 | 16.6 | 8.4 |
| $10\log_{10}\dfrac{P_{-100kHz\ to\ 100kHz}}{P_{300kHz\ to\ 500kHz}}$ | 97.6 | 61.3 | 36.3 |

METHOD AND RADIO STATION FOR DATA TRANSMISSION

CROSS-REFERENCE TO RELATED APPLICATION

This is a continuation of international application PCT/DE99/00269, filed Feb. 1, 1999, which designated the United States.

BACKGROUND OF THE INVENTION

Field of the Invention

The invention lies in the communications field and relates, more specifically, to a method and a radio station for data transmission via a radio interface in a GSM mobile radio system.

U.S. Pat. No. 4,914,651 (European patent application EP 0 360 589 A) describes a mobile radio system in which additional channels having a bandwidth of 2 kHz are arranged between each two normal AMPS channels having a bandwidth of 30 kHz.

In radio communications systems, which are also referred to as wireless communications systems, data (for example voice, image information, or other data) are transmitted as signals with the aid of electromagnetic waves. The electromagnetic waves travel via a radio interface between a transmitting and a receiving radio station (base station and mobile station, respectively). The electromagnetic waves are in this case transmitted at carrier frequencies which are in the frequency band envisaged for the respective system. In the case of GSM (Global System for Mobile Communication), the carrier frequencies are currently in the range of 900, 1800 or 1900 MHz. Use in other frequency bands is equally possible.

During their propagation in a propagation medium, the signals are subject to interference from noise. As a result of diffraction and reflections, signal components traverse different propagation paths and are superposed in the receiver, where they lead to cancellation effects. Furthermore, if there is more than one signal source, these signals are superposed. Frequency division multiple access (FDMA), time division multiple access (TDMA), or a method known as code division multiple access (CDMA) is used to distinguish between the signal sources and thus to separate the signals at the receiver.

The GSM mobile radio system which is in existence at the present time is a radio communications system using a TDMA component for subscriber separation (Time Division Multiple Access). Useful information of the subscriber connections is transmitted in time slots in accordance with a frame structure. The transmission takes place in blocks. For modulation, use is made of a GMSK modulation method (Gaussian minimum shift keying) with a modulation bandwidth of BT=0.3. The modulation bandwidth BT is a bandwidth/time product which, according to GSM 05.04 Version 4.0.3, pp. 7–21, designates the modulation method. The modulation bandwidth BT is a value referring to the bandwidth B available for the transmission of a bit of length T. Additional information may be found in J. Biala, "Mobilfunk und intelligente Netze" [Mobile radio and intelligent networks], Vieweg Verlag, 1995, pp. 104–06.

On account of the spectral properties of this modulation, two adjacent channels of the radio interface cannot be used in the same radio cell. A GSM channel has a bandwidth of 200 kHz. As illustrated in FIG. 3, at least one channel—the one drawn using a broken line—cannot be used on account of adjacent channel interference.

The rapidly increasing number of subscribers in GSM mobile radio networks means that the network operators are reaching the limits of the capacity of their networks, since only a limited frequency spectrum is available to them. Any increase in the capacity of a GSM network would therefore be advantageous.

SUMMARY OF THE INVENTION

The object of the invention is to provide a data transfer method and radio station which overcomes the above-noted deficiencies and disadvantages of the prior art devices and methods of this kind, and which increases the capacity of a GSM mobile radio network.

With the above and other objects in view there is provided, in accordance with the invention, a method of data transmission via a radio interface in a mobile radio system, which comprises:

modulating transmission signals at a transmission end for data to be transmitted via a given connection, with a first modulation bandwidth, and using a channel with a first bandwidth for the connection;

determining at least one quality parameter of a transmission quality of a data transmission of the connection; and selectively altering the modulation bandwidth for the connection in dependence on the quality parameter, and subsequently using a channel with a second bandwidth for the connection.

In other words, at least one quality parameter of the transmission quality of the data transmission of a connection is determined and the modulation bandwidth for the connection is altered as a function of the quality parameter. This allows adaptation of the bandwidth, and thus of the adjacent channel interference, in a manner which is appropriate to the requirements and to the situation. The bandwidth can be reduced progressively, with the result that in the same radio cell or in adjacent radio cells, on account of the reduction in adjacent channel interference, the capacity is increased by the utilization of additional channels.

The quality parameters which may be included in the process are, in accordance with various features of the invention and by way of example:

a number of channel coefficients of a channel pulse response for the connection which contain a predeterminable proportion of the total energy of the channel pulse response;

a signal level;

a number of detection errors (e.g. RXQUAL as a GSM-standardized representation of the bit error rate).

These quantities can be utilized particularly advantageously for quality statements since they are regularly determined and evaluated in the course of reception-end evaluation of the transmitted signals. It is equally possible to use a combination of these quantities for decision-making purposes.

The detection errors are advantageously determined by evaluation of a training sequence. Consequently, the quality parameter is particularly reliable since the training sequence is known at the reception end and a correct comparison value is available.

If dynamic channel allocation is used, the channel with a reduced bandwidth can be allocated as a function of the transmission quality. If the quality deteriorates, then the modulation bandwidth is increased once more. If the process is applied to a plurality of mobile stations, then this increases the total capacity within the radio cell since, among the many mobile stations, more than one will always have transmission conditions suitable for bandwidth reduction.

In accordance with an additional feature of the invention, the modulation is a GMSK modulation at a modulation bandwidth of BT<0.3 or a GMSK modulation at a modulation bandwidth of BT=0.3.

In this development of the novel method for data transmission via a radio interface in a GSM mobile radio system the data of the transmission signals are modulated with CPM modulation at the transmission end. A bandwidth is produced which is narrower than in the case of GMSK modulation with a modulation bandwidth of BT=0.3. Consequently, at least one channel with a reduced bandwidth is provided by the radio interface. The reduction of the modulation bandwidth goes beyond the permitted tolerances according to GSM 05.04 Version 4.0.3, pp. 7–21. Detection of the data is carried out at the reception end. This detection can be effected without distinguishing between channels with different bandwidths. This last also allows downward compatibility with existing mobile stations.

As a result, account is taken of the continuous improvement in detectors at the reception end and of the reduction in the size of radio cells, which guarantee a sufficient data transmission quality even given a smaller modulation bandwidth. If the modulation bandwidth is reduced, it is possible to use additional channels within a radio cell. The capacity of the GSM mobile radio network is significantly increased. It is advantageous to use GSMK modulation with a modulation bandwidth of BT<0.3, but other CPM (continuous phase modulation) transmission methods according to C. E. Sundberg, "Continuous Phase Modulation", IEEE Communication Magazine, Vol. 24, No.4, pp. 35–38, April 1986, can also be used in the GSM mobile radio system.

In accordance with again a further feature of the invention, the radio interface provides channels with at least two different bandwidths for data transmission. This means that existing circuitry can continue to be used but in addition transmission devices for channels with a reduced bandwidth are introduced into the radio station or existing transmission devices are matched to the smaller modulation bandwidth. As a result, two channel types with a different bandwidth exist alongside one another.

As a result of the channels with a reduced bandwidth, adjacent frequency bands in a radio cell are advantageously used for data transmission. The utilization of adjacent radio channels virtually doubles the capacity of the radio interface. Experiments have shown that a modulation bandwidth of about BT=0.15 permits a good transmission quality and utilization of adjacent frequency bands.

The method according to the invention can be applied particularly advantageously to microcells or interiors. These have a reduced cell radius so that, as a rule, the transmission conditions are good enough to use the reduced modulation bandwidth. Consequently, the transmission capacity of the radio interface can be increased by a number of at least two channels per 400 kHz contiguous bandwidth, i.e., given a GSM bandwidth of 200 kHz, a minimum spacing of the center frequencies of 600 kHz is dispensed with.

Furthermore, it is advantageous to allocate at least two channels for a connection, at least one channel having a reduced bandwidth. The data rate can thus be increased for this connection, which is of interest particularly for data services (i.e. no voice information).

With the above and other objects in view there is also provided, in accordance with the invention, a radio station for data transmission via a radio interface in a mobile radio system, comprising:

a modulation device for modulating transmission signals containing data to be transmitted, selectively at two different modulation bandwidths corresponding to transmission channels having different bandwidths;

a control device connected to the modulation device for changing a previously chosen bandwidth for a transmission of the data of a connection in dependence on a transmission quality of the data transmission of the connection; and a high-frequency device connected to the modulation device for transmitting modulated transmission signals of a connection with the two different modulation bandwidths.

As noted above, the transmission quality of the data transmission is defined with one or more quality parameters.

Other features which are considered as characteristic for the invention are set forth in the appended claims.

Although the invention is illustrated and described herein as embodied in a method and radio station for data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
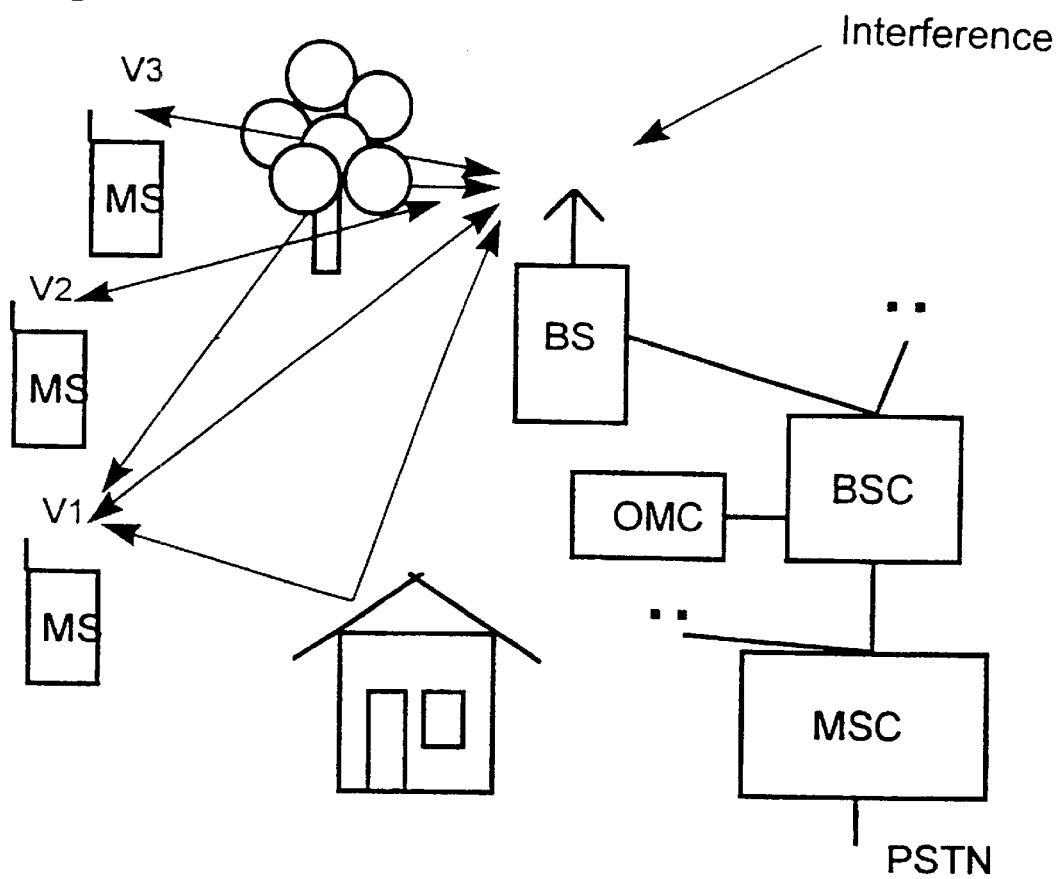
FIG. 1 is a block diagram of a GSM mobile radio network.

Referring now to the figures of the drawing in detail and first, particularly, to FIG. 1 thereof, there is seen a GSM mobile radio system with a multiplicity of mobile switching centers MSC which are networked together and/or establish access to a fixed network PSTN. Furthermore, the mobile switching centers MSC are connected to at least one base station controller BSC in each case. Each base station controller BSC enables in turn a connection to at least one base station BS. Such a base station BS is a radio station which, via a radio interface, can set up a connection to further radio stations, i.e. to mobile stations MS or other data terminals.

FIG. 1 illustrates by way of example connections V1, V2, V3 for the transmission of useful information and signaling information between mobile stations MS and a base station BS. An operation and maintenance center OMC realizes control and maintenance functions for the GSM mobile radio system or for parts thereof.

Figure 2:
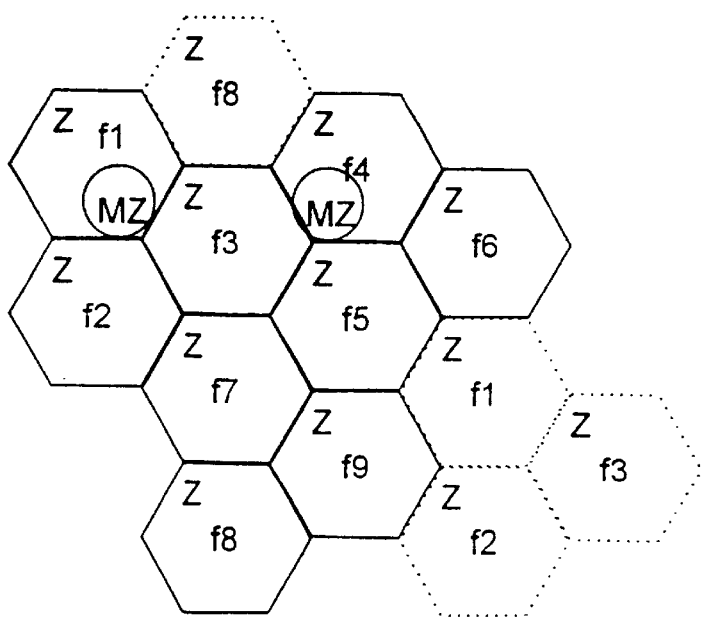
FIG. 2 is a diagram of a cellular structure of the GSM mobile radio network.
Figure 3:
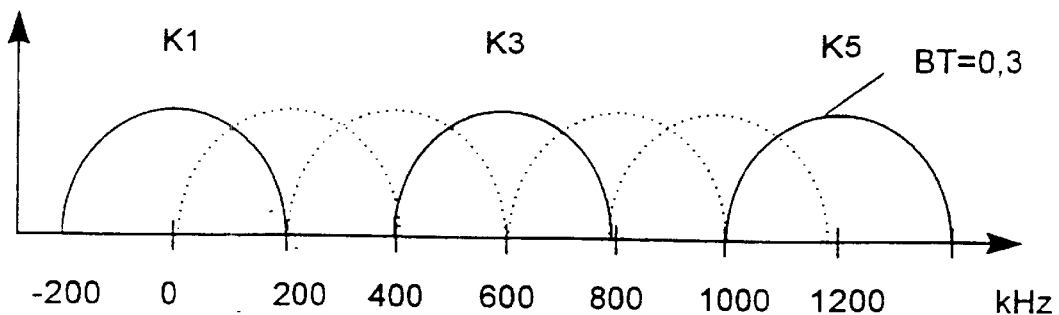
FIG. 3 is a graph showing a spectral power distribution of radio channels.

The prior art with regard to bandwidth utilization is illustrated in FIGS. 2 and 3. A GSM mobile radio network is subdivided in a cellular fashion. A radio area Z, MZ of a base station BS forms a cell in which individual carrier frequencies f1 to f9 are available for the radio channels to and from the mobile stations MS. It should be noted here that a grouping for the frequency distribution which guarantees a sufficient spacing between two cells Z with the same carrier frequency f1 is usually chosen. This so-called frequency grid pattern according to FIG. 2 groups nine respective carrier frequencies such that cells with a commonly used carrier frequency f1 are separated at least by two cells Z. This minimizes the adjacent cell interference.

The conditions within a cell Z, MZ are illustrated in FIG. 3, where channels K1, K3, K5 each have a bandwidth of 200 kHz, but the spectral distribution of the transmission power extends beyond this bandwidth of 200 kHz. Therefore, the channel spacing within a cell is at least 400 kHz within a cell. This applies to the modulation bandwidth BT=0.3 that is recommended in the GSM Standard. The power of the signals of a channel has decayed by approximately 35 dB at the center frequency of the adjacent channel (+/−200 kHz).

Figure 4:
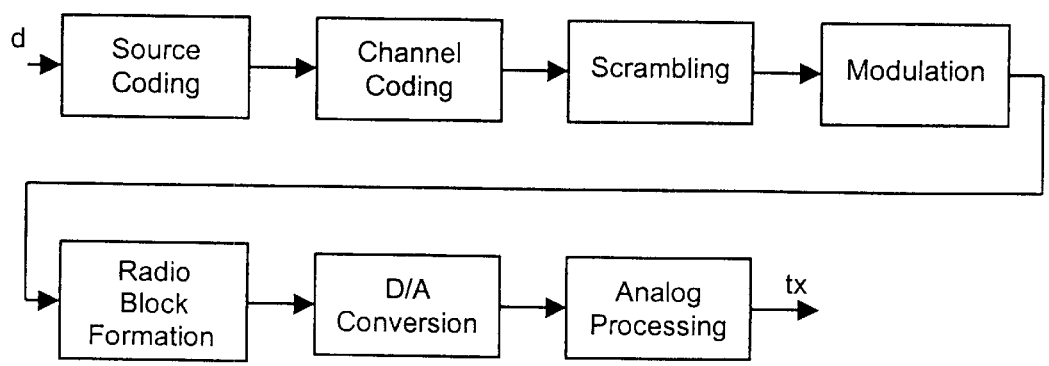
FIG. 4 is a signal flow chart illustrating signal processing at the transmission end.

Referring now to FIG. 4, there is illustrated signal processing at the transmission end for data d to be transmitted. Source coding takes place, i.e., in the case of voice transmission, the voice information is coded in the form of data symbols. Channel coding follows, which results in increased interference immunity especially for data transmission via the radio interface.

Furthermore, the transmission signals are scrambled in order to be able to better compensate for influences of momentary interference at the reception end. This is followed by modulation, which will be discussed in more detail below. During radio block formation, not only the data to be transmitted but also symbols of a training sequence are embedded in a radio block, so that channel estimation for determining channel impulse responses and subsequently channel-adapted detection are effected at the reception end with the aid of the training sequence. The symbols of the radio block are subjected to digital/analog conversion and, by means of analog signal processing, are converted into the frequency band of the carrier frequency, amplified and filtered. The radio-frequency signal can then be transmitted.

Figures 5, 6:
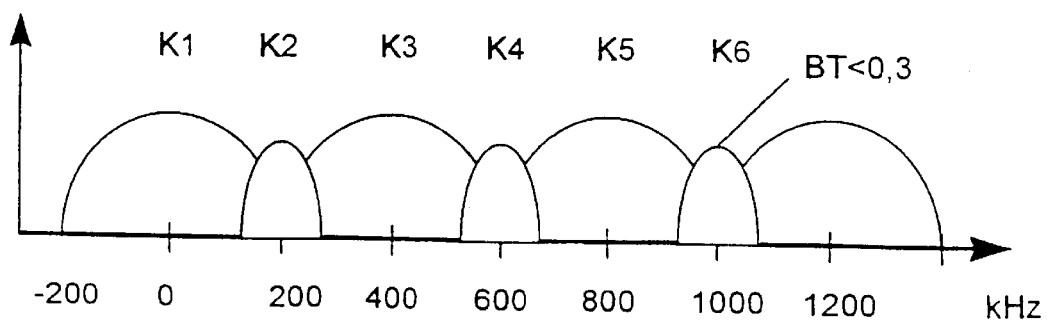
FIG. 5 is a table with values for the adjacent channel interference as a function of the modulation type.
FIGS. 6 and 7 are graphs showing spectral power distributions of radio channels with a different modulation bandwidth.

The modulation is modified according to the invention to the effect that although MSK modulation with Gaussian filtering continues to be used, the modulation bandwidth BT is reduced to values of less than 0.3. FIG. 5 shows an illustration of the energy ratios for a channel (−100 to +100 kHz) in relation to the adjacent (+100 to +300 kHz) and next but one (+300 to +500 kHz) channel. This shows that with a modulation bandwidth of BT=0.15, a gain of 8.4 dB is obtained, i.e. the adjacent channel interference is significantly reduced.

Despite the smaller modulation bandwidth BT, detection at the reception end is possible, and, moreover, with conventional mobile stations MS. Intersymbol interference can be observed over two symbols in the case of a modulation bandwidth of BT=0.3, whereas interference occurs over four symbols in the case of BT=0.15. Since a customary GSM receiver can compensate for intersymbol interference over five symbols, data transmission with a modulation bandwidth of BT=0.15, for example, is also downward compatible. Even modulation bandwidths of between BT=0.3 and BT=0.15 or somewhat less than BT=0.15 allow detection without any problems.

If channels with a relatively small modulation bandwidth BT are created at the transmission end, then a spectral distribution according to FIG. 6 is produced, for example. Radio channels K2, K4, K6 with a modulation bandwidth of BT<0.3 are inserted between the channels with a conventional modulation bandwidth of BT=0.3. On account of the spectral properties of these additional radio channels K2, K4, K6, the adjacent channel interference is limited, with the result that the data transmission in the radio channels K1, K3, K5 is not noticeably impaired.

Figure 7:
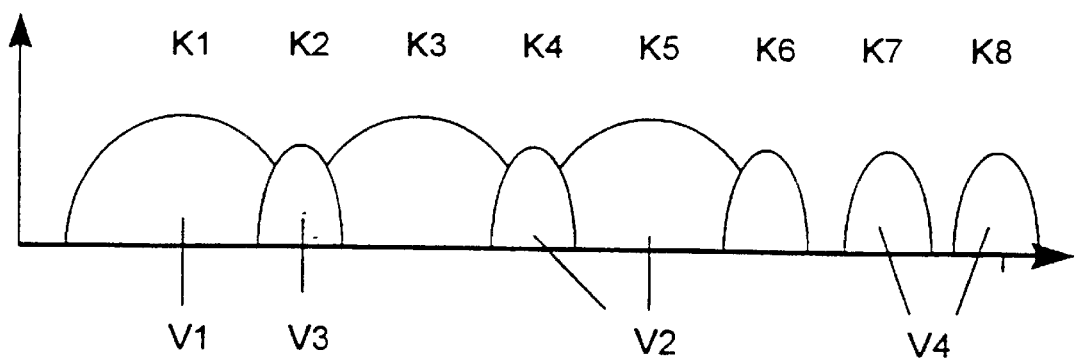

The possibilities resulting from the reduced bandwidth are explained with reference to FIG. 7.

The problem of adjacent channel interference is particularly serious for applications in microcells or in interiors (indoors). However, since the short distances mean that a high reception level is present and the multipath propagation is limited, the bandwidth reduction according to the invention enables an increase in capacity, see connection V4 in FIG. 7.

It is the case particularly for data connections in which the data to be transmitted are not voice information that the data rate can be increased according to the invention by two channels K4 and K5, and K7 and K8, respectively being allocated to a connection V2, V4. In this case, the connection may be configured asymmetrically. In the downlink direction, a higher data rate is achieved by allocation of two or more channels. If two adjacent radio channels K4 and K5 are used for a connection V2, then the powers of the two radio channels are strongly coupled to one another, so that it can be assumed that the powers of the two radio channels remain constant relative to one another. Adjacent channel interference is thus greatly reduced.

Figure 8:
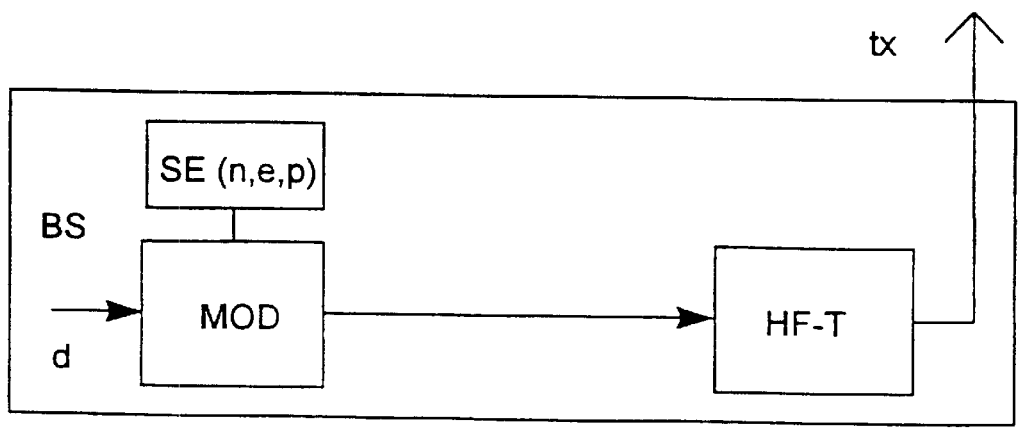
FIG. 8 is a block diagram of a radio station.

The modulation bandwidth BT for the data d to be transmitted is advantageously set by a control device SE of the base station BS according to FIG. 8. The control device SE controls a modulation device MOD which modulates the transmission signals tx prior to high-frequency processing in the high-frequency device HF-T. The control is adaptive and is based on evaluation of quality parameters n, e, p with regard to the reception conditions. According to FIG. 9, in step 1 a connection set-up with a modulation bandwidth BT=0.3 is carried out and, in the process, the transmission quality is determined using a quality parameter p, n, e. This can be done during the evaluation of an access radio block (random access burst) or of a normal radio block (normal burst).

The quality parameter p, n, e determined in the process is designated by a number n of channel coefficients of a channel impulse response for the connection which contain a predeterminable proportion of the total energy of the channel impulse response, a signal level p, a number e of detection errors.

Figure 9:
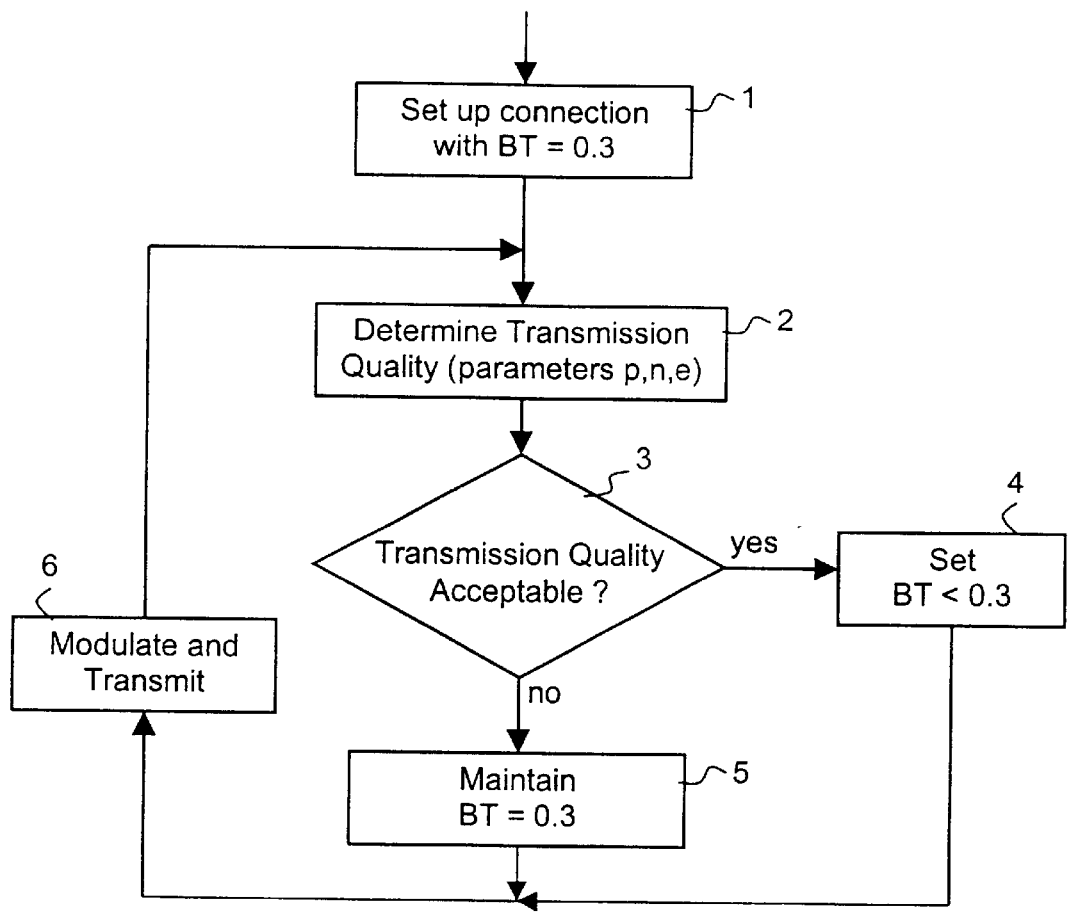
FIG. 9 is a flow chart of the method of choosing the modulation bandwidth.

These quality parameters p, n, e are regularly determined and evaluated during the reception-end evaluation of the transmitted signals (step 2 in FIG. 9). It is equally possible to use a combination of these quantities for decision-making purposes. The detection errors are advantageously determined by evaluation of a training sequence.

For the decision according to step 3 in FIG. 9, by way of example, the number n must be less than four, the signal level p must be 4 dB above a reference sensitivity level and the number e of detection errors per training sequence must be less than two, in order that a modulation bandwidth of BT<0.3 can be allocated for the connection (step 4 in FIG. 9). If the quality parameters p, n, e are not adhered to, then in step 5 the modulation bandwidth of BT=0.3 is preserved. Afterwards, the data are modulated in step 6 and transmitted as radio block. During the connection, too, the transmission quality is monitored and thus the modulation bandwidth BT is altered or additional radio channels are allocated to a connection or withdrawn again. The modulation bandwidth BT can also be reduced progressively, in which case a plurality of decision stages are necessary.

It can be regarded as particularly advantageous to allocate two adjacent radio channels K4, K5 to a connection since receivers that can be produced economically can thus be used. By means of modern analog/digital converters and extended filter bandwidths, two channels can be processed in parallel without major additional outlay at the reception end with a high-frequency device that otherwise remains essentially the same.

We claim:

1. A method of data transmission via a radio interface in a mobile radio system, which comprises:
   modulating transmission signals at a transmission end for data to be transmitted via a given connection, with a first modulation bandwidth, and using a channel with a first bandwidth for the connection;
   determining at least one quality parameter of a transmission quality of a data transmission of the connection; and
   selectively altering the modulation bandwidth for the connection in dependence on the quality parameter, and subsequently using a channel with a second bandwidth for the connection.

2. The method according to claim 1, wherein the determining step comprises determining a number of channel coefficients of a channel impulse response containing a predeterminable proportion of a total energy of the channel impulse response as the quality parameter.

3. The method according to claim 1, wherein the determining step comprises determining a signal level as the quality parameter.

4. The method according to claim 1, wherein the determining step comprises determining a number of detection errors as the quality parameter.

5. The method according to claim 4, which comprises determining the detection errors by evaluating a training sequence.

6. The method according to claim 1, wherein the determining step comprises determining at least one parameter from the group consisting of a number of channel coefficients of a channel impulse response containing a predeterminable proportion of a total energy of the channel impulse response, a signal level, and a number of detection errors.

7. The method according to claim 1, which comprises selectively modulating with a GMSK modulation at a modulation bandwidth of BT<0.3 and a GMSK modulation at a modulation bandwidth of BT=0.3.

8. The method according to claim 1, which comprises using adjacent frequency bands in a radio cell for data transmission.

9. The method according to claim 1, which comprises setting one of the modulation bandwidths to BT=0.15.

10. The method according to claim 1, which comprises, for microcells or interior applications, increasing a transmission capacity of a radio interface by a number of at least two channels per 400 kHz of contiguous bandwidth.

11. The method according to claim 1, which comprises allocating one of the connections at least two channels, wherein at least one channel has a relatively reduced bandwidth.

12. A radio station for data transmission via a radio interface in a mobile radio system, comprising:
    a modulation device for modulating transmission signals containing data to be transmitted, selectively at two different modulation bandwidths corresponding to transmission channels having different bandwidths;
    a control device connected to said modulation device for changing a previously chosen bandwidth for a transmission of the data of a connection in dependence on a transmission quality of the data transmission of the connection; and
    a high-frequency device connected to said modulation device for transmitting modulated transmission singnals of a connection with the two different modulation bandwidths.

13. The radio station according to claim 12, wherein the transmission quality of the data transmission is defined with at least one quality parameter.

* * * * *